(12) United States Patent
Wozniak et al.

(10) Patent No.: US 8,616,673 B2
(45) Date of Patent: Dec. 31, 2013

(54) METHOD OF CONTROLLING PRINT DENSITY

(75) Inventors: Terry A. Wozniak, Springfield, OH (US); Joseph P. Mangan, Dayton, OH (US)

(73) Assignee: Eastman Kodak Company, Rochester, NY (US)

( * ) Notice: Subject to any disclaimer, the term of this patent is extended or adjusted under 35 U.S.C. 154(b) by 363 days.

(21) Appl. No.: 12/915,091

(22) Filed: Oct. 29, 2010

(65) Prior Publication Data

US 2012/0105533 A1    May 3, 2012

(51) Int. Cl.
*B41J 29/393* (2006.01)

(52) U.S. Cl.
USPC .................. 347/19; 347/14; 399/60

(58) Field of Classification Search
USPC ..................... 347/5, 14, 19; 399/60
See application file for complete search history.

(56) References Cited

U.S. PATENT DOCUMENTS

| | | | |
|---|---|---|---|
| 4,636,808 A | 1/1987 | Herron | |
| 4,796,065 A * | 1/1989 | Kanbayashi | 399/60 |
| 5,210,572 A * | 5/1993 | MacDonald et al. | 399/27 |
| 5,260,725 A * | 11/1993 | Hammond | 347/132 |
| 5,671,059 A * | 9/1997 | Vincent | 356/402 |
| 6,079,821 A | 6/2000 | Chwalek et al. | |
| 6,457,807 B1 | 10/2002 | Hawkins et al. | |
| 6,491,362 B1 | 12/2002 | Jeanmaire | |
| 6,505,921 B2 | 1/2003 | Chwalek et al. | |
| 6,554,410 B2 | 4/2003 | Jeanmaire et al. | |
| 6,575,566 B1 | 6/2003 | Jeanmaire et al. | |
| 6,588,888 B2 | 7/2003 | Jeanmaire et al. | |
| 6,793,328 B2 | 9/2004 | Jeanmaire et al. | |
| 6,827,429 B2 | 12/2004 | Jeanmaire et al. | |
| 6,851,796 B2 | 2/2005 | Jeanmaire et al. | |
| 7,593,130 B2 * | 9/2009 | Mongeon et al. | 358/1.4 |
| 2001/0022901 A1 * | 9/2001 | Suetsugu | 399/57 |
| 2010/0123907 A1 * | 5/2010 | Edgar et al. | 358/1.5 |
| 2011/0271141 A1 * | 11/2011 | Kursun et al. | 714/6.3 |

* cited by examiner

*Primary Examiner* — Julian Huffman
*Assistant Examiner* — Sharon A Polk
(74) *Attorney, Agent, or Firm* — Nelson Adrian Blish

(57) ABSTRACT

A method of controlling print density in a printing system includes gathering first data from a first sensor; gathering second data from a second sensor; comparing the first data to the second data; if the first data correlates to the second data no action is required; if the first data deviates from the second data; determine a confidence level for each sensor; identify the sensor with the lowest confidence level; and take corrective action.

14 Claims, 6 Drawing Sheets

METHOD OF CONTROLLING PRINT DENSITY

FIELD OF THE INVENTION

The present invention generally relates to inkjet printing systems, and more particularly, to such inkjet printing systems that maintain control on the print density of images printed by the printing system.

BACKGROUND OF THE INVENTION

In inkjet printing systems, it is desirable to control and maintain the print density of the printed images over time. The print density is influenced by the optical density of the inks used. As the optical density of the inks depends on the concentration of the ink, it is common for the printing system to include an ink concentration sensor. To provide additional control on the print density, especially in color printing systems, the printing system can include sensors for measuring print density of the printed images. It has been found that both ink concentration sensors and print density sensors can fail, allowing the print density to deviate from normal. An improved control system is needed to overcome this problem with prior art systems.

SUMMARY OF THE INVENTION

Briefly, according to one aspect of the present invention a method of controlling print density in a printing system includes gathering first data from a first sensor; gathering second data from a second sensor; comparing the first data to the second data; if the first data correlates to the second data no action is required; if the first data deviates from the second data; determine a confidence level for each sensor; identify the sensor with the lowest confidence level; and take corrective action.

The invention and its objects and advantages will become more apparent in the detailed description of the preferred embodiment presented below.

DETAILED DESCRIPTION OF THE INVENTION

Figure 1:
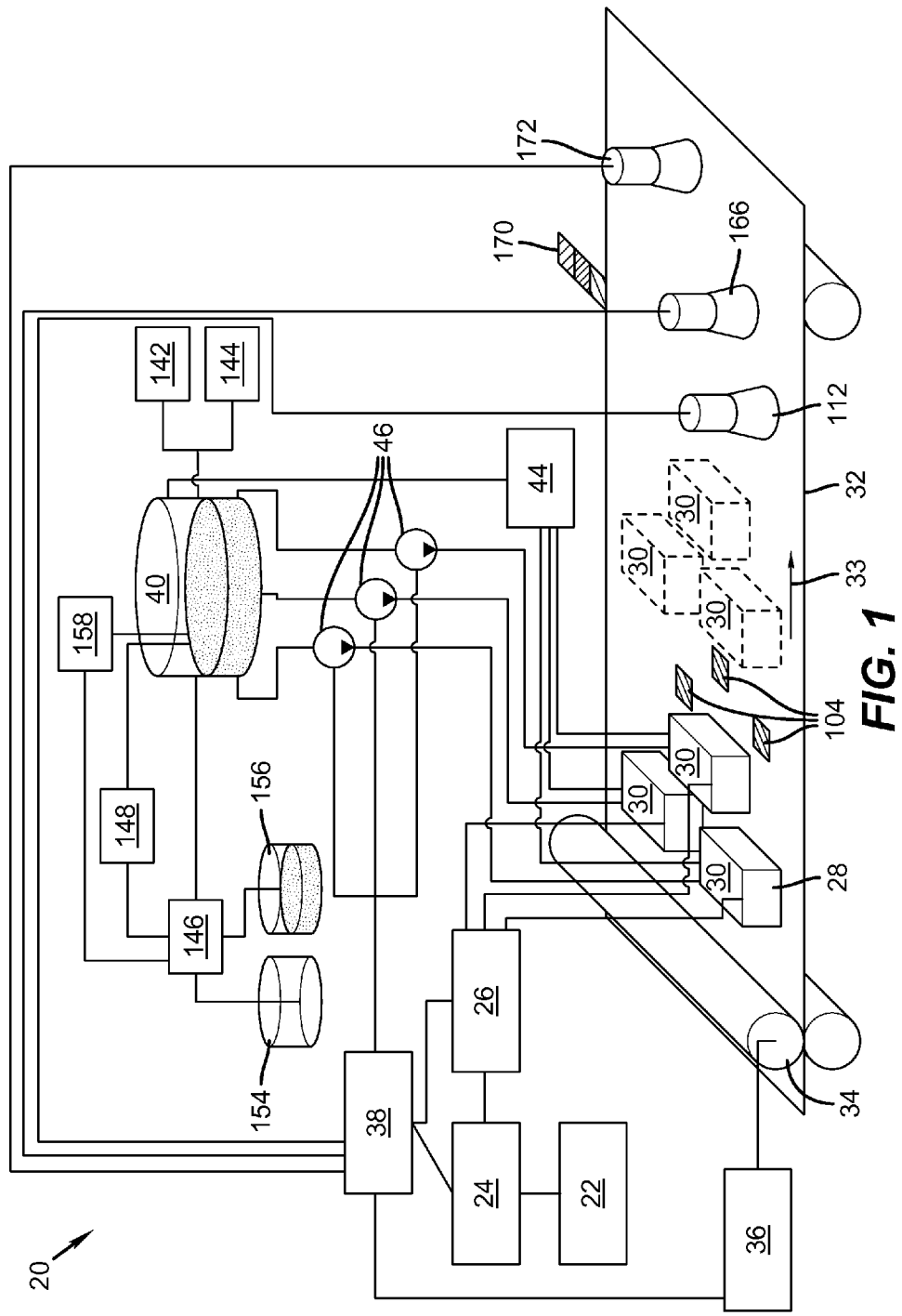
FIG. 1 is a simplified block schematic diagram of an example embodiment of a printer system made in accordance with the present invention.

The present description will be directed in particular to elements forming part of, or cooperating more directly with, apparatus in accordance with the present invention. It is to be understood that elements not specifically shown or described may take various forms well known to those skilled in the art. In the following description and drawings, identical reference numerals have been used, where possible, to designate identical elements.

The example embodiments of the present invention are illustrated schematically and not to scale for the sake of clarity. One of ordinary skill in the art will be able to readily determine the specific size and interconnections of the elements of the example embodiments of the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. As such, as described herein, the terms "liquid" and "ink" refer to any material that can be ejected by the printhead or printhead components described below.

Figure 2:
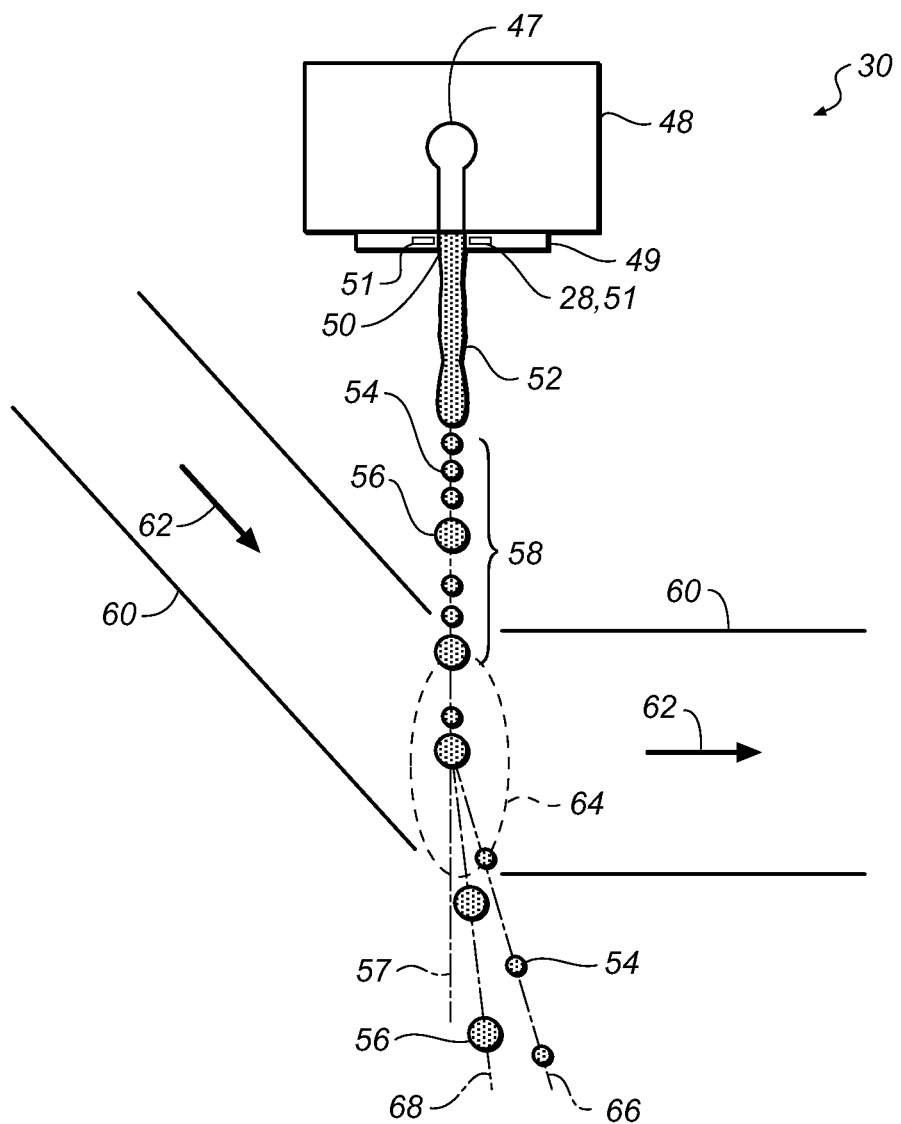
FIG. 2 is a schematic view of an example embodiment of a continuous printhead made in accordance with the present invention.
Figure 3:
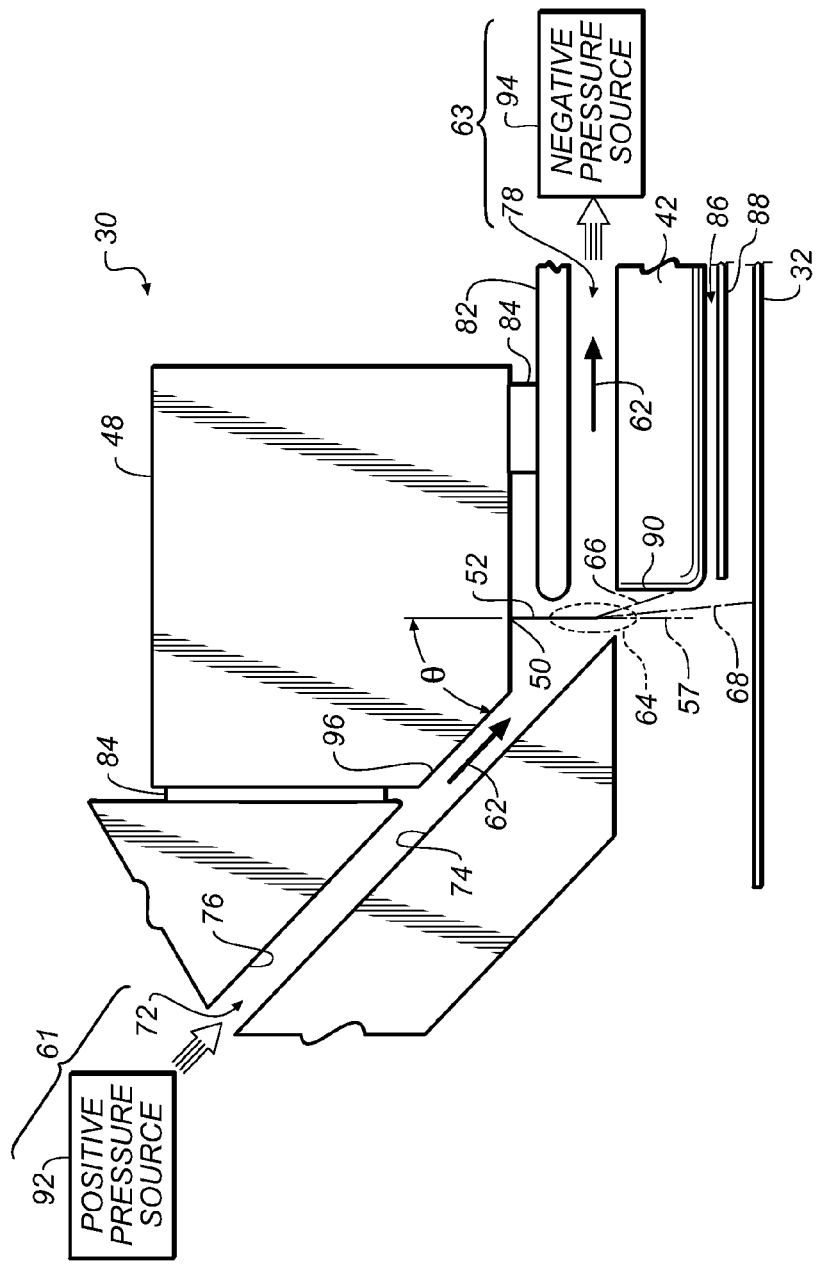
FIG. 3 is a schematic view of a simplified gas flow deflection mechanism of the present invention.

Referring to FIGS. 1-3, example embodiments of a printing system and a continuous printhead are shown that include the present invention described below. It is contemplated that the present invention will also find application in other types of printheads or jetting modules including, for example, drop on demand printheads and other types of continuous printheads.

Referring to FIG. 1, a continuous printing system 20 includes an image source 22 such as a scanner or computer which provides raster image data, outline image data in the form of a page description language, or other forms of digital image data. This image data is converted to half-toned bitmap image data by an image processing unit 24 which also stores the image data in memory. A plurality of drop forming mechanism control circuits 26 read data from the image memory and apply time-varying electrical pulses to a drop forming device(s) 28 that are associated with one or more nozzles of one or more printheads 30. These pulses are applied at an appropriate time, and to the appropriate nozzle, so that drops formed from a continuous inkjet stream will form spots on a recording medium 32 in the appropriate position designated by the data in the image memory.

Recording medium 32 is moved relative to printheads 30, as indicated by arrow 33, by a recording medium transport system 34, which is electronically controlled by a recording medium transport control system 36, and which in turn is controlled by a micro-controller 38. The recording medium transport system shown in FIG. 1 is a schematic only, and many different mechanical configurations are possible. For example, a transfer roller could be used as recording medium transport system 34 to facilitate transfer of the ink drops to recording medium 32. Such transfer roller technology is well known in the art. In the case of page width printheads, it is most convenient to move recording medium 32 past a stationary printhead. For page wide printing applications it is common to employ a plurality of printheads 30, rather than a single printhead to print across the width of the recording medium. The printheads typically are positioned relative to each other so that print swaths from each of the printheads are stitched together to form single print region spanning the recording medium. While a group of three printheads 30 are shown to cover the print region in the FIG. 1, other numbers of printheads can be employed to span the desired print region. The number of printheads used depends of the print width of each printhead and the desired print width. However, in the case of scanning print systems, it is usually most convenient to move the printhead along one axis (the sub-scanning direction) and the recording medium along an orthogonal axis (the main scanning direction) in a relative raster motion. In some printing systems, it is desirable to print with more than one color of ink. In such systems, additional groups of printheads are typically used for each additional ink color. One such additional group of three printheads is denoted by the dashed line printheads 30. A similar reservoir, pressure regulators, and recycling unit (not shown) would be used to supply and retrieve ink from the additional groups of printheads. As their structure and operation is the same as those used for the first group of printheads, they have been omitted from FIG. 1 for drawing clarity.

Ink contained in an ink reservoir 40 is supplied under sufficient pressure to the printheads 30 to cause continuous streams of ink to flow from each of the nozzles of the printheads 30; see also FIGS. 2 and 3. In the non-printing state, continuous inkjet drop streams are unable to reach recording medium 32 due to an ink catcher 42 that blocks the stream and which may allow a portion of the ink to be recycled by an ink recycling unit 44. The ink recycling unit reconditions the ink and feeds it back to reservoir 40. Such ink recycling units are well known in the art. The ink pressure suitable for optimal operation will depend on a number of factors, including geometry and thermal properties of the nozzles and thermal properties of the ink. A constant ink pressure can be achieved by applying pressure to ink reservoir 40 under the control of ink pressure regulator. Alternatively, the ink reservoir is left unpressurized, or even under a reduced pressure (vacuum), and a pump is employed to deliver ink from the ink reservoir under pressure to the printhead 30. In such an embodiment, the ink pressure regulator 46 can comprise an ink pump control system. In multi-printhead systems, it is common for independent ink pressure regulators 46 to be used for each of the printheads 30.

The ink is distributed to printhead 30 through an ink channel 47, shown in FIG. 2. The ink preferably flows through slots or holes etched through a silicon substrate of printhead 30 to its front surface, where a plurality of nozzles and drop forming mechanisms, for example, heaters, are situated. When printhead 30 is fabricated from silicon, drop forming mechanism control circuits 26 can be integrated with the printhead. Printhead 30 also includes a deflection mechanism (not shown in FIG. 1) which is described in more detail below with reference to FIGS. 2 and 3.

Referring to FIG. 2, a schematic view of continuous liquid printhead 30 is shown. A jetting module 48 of printhead 30 includes an array or a plurality of nozzles 50 formed in a nozzle plate 49. In FIG. 2, nozzle plate 49 is affixed to jetting module 48. However, as shown in FIG. 3, nozzle plate 49 can be an integral portion of the jetting module 48.

Liquid, for example, ink, is emitted under pressure through each nozzle 50 of the array to form filaments of liquid 52. In FIG. 2, the array or plurality of nozzles extends into and out of the figure.

Jetting module 48 is operable to form liquid drops having a first size or volume and liquid drops having a second size or volume through each nozzle. To accomplish this, jetting module 48 includes a drop stimulation or drop forming device 28, for example, a heater or a piezoelectric actuator, that, when selectively activated, perturbs each filament of liquid 52, for example, ink, to induce portions of each filament to break off from the filament and coalesce to form drops 54, 56.

In FIG. 2, drop forming device 28 is a heater 51, for example, an asymmetric heater or a ring heater (either segmented or not segmented), located in a nozzle plate 49 on one or both sides of nozzle 50. This type of drop formation is known and has been described in, for example, U.S. Pat. No. 6,457,807 (Hawkins et al.); U.S. Pat. No. 6,491,362 B1 (Jeanmaire); U.S. Pat. No. 6,505,921 (Chwalek et al.); U.S. Pat. Nos. 6,554,410; 6,575,566; 6,588,888; 6,793,328; 6,827,429; and 6,851,796 (all to Jeanmaire et al.).

Typically, one drop forming device 28 is associated with each nozzle 50 of the nozzle array. However, a drop forming device 28 can be associated with groups of nozzles 50 or all of nozzles 50 of the nozzle array.

When printhead 30 is in operation, drops 54, 56 are typically created in a plurality of sizes or volumes, for example, in the form of large drops 56, a first size or volume, and small drops 54, a second size or volume. The ratio of the mass of the large drops 56 to the mass of the small drops 54 is typically approximately an integer between 2 and 10. A drop stream 58 including drops 54 and 56, and follows a drop path or trajectory 57. Drops of the small size are created by application of drop formation pulses to the liquid stream issuing from a nozzle at a base drop formation frequency.

Printhead 30 also includes a gas flow deflection mechanism 60 that directs a flow of gas 62, for example, air, past a portion of the drop trajectory 57. This portion of the drop trajectory is called the deflection zone 64. As the flow of gas 62 interacts with drops 54, 56 in deflection zone 64 it alters the drop trajectories. As the drop trajectories pass out of the deflection zone 64 they are traveling at an angle, called a deflection angle, relative to the undeflected drop trajectory 57.

Small drops 54 are more affected by the flow of gas than are large drops 56 so that the small drop trajectory 66 diverges from the large drop trajectory 68. That is, the deflection angle for small drops 54 is larger than for large drops 56. The flow of gas 62 provides sufficient drop deflection and therefore sufficient divergence of the small and large drop trajectories so that catcher 42 (shown in FIG. 3) can be positioned to intercept one of the small drop trajectory 66 and the large drop trajectory 68 so that drops following the trajectory are collected by catcher 42, while drops following the other trajectory 57 bypass the catcher and impinge a recording medium 32 (shown in FIGS. 1 and 3).

When catcher 42 is positioned to intercept large drop trajectory 68, small drops 54 are deflected sufficiently to avoid contact with catcher 42 and strike the recording medium. As the small drops are printed, this is called small drop print mode. When catcher 42 is positioned to intercept small drop trajectory 66, large drops 56 are the drops that print. This is referred to as large drop print mode.

Referring to FIG. 3, jetting module 48 includes an array or a plurality of nozzles 50. Liquid, for example, ink, supplied through channel 47, shown in FIG. 2, is emitted under pressure through each nozzle 50 of the array to form filaments of liquid 52. In FIG. 3, the array or plurality of nozzles 50 extends into and out of the figure.

Drop stimulation or drop forming device 28 (shown in FIGS. 1 and 2) associated with jetting module 48 is selectively actuated to perturb the filament of liquid 52 to induce portions of the filament to break off from the filament to form drops. In this way, drops are selectively created in the form of large drops and small drops that travel toward a recording medium 32.

Positive pressure gas flow structure 61 of gas flow deflection mechanism 60 is located on a first side of drop trajectory 57. Positive pressure gas flow structure 61 includes first gas flow duct 72 that includes a lower wall 74 and an upper wall 76. Gas flow duct 72 directs gas flow 62 supplied from a positive pressure source 92 at downward angle θ of approximately a 45° relative to liquid filament 52 toward drop deflection zone 64 (also shown in FIG. 2). An optional seal(s) 84 provides an air seal between jetting module 48 and upper wall 76 of gas flow duct 72.

Upper wall 76 of gas flow duct 72 does not need to extend to drop deflection zone 64 (as shown in FIG. 2). In FIG. 3, upper wall 76 ends at a wall 96 of jetting module 48. Wall 96 of jetting module 48 serves as a portion of upper wall 76 ending at drop deflection zone 64.

Negative pressure gas flow structure 63 of gas flow deflection mechanism 60 is located on a second side of drop trajectory 57. Negative pressure gas flow structure includes a second gas flow duct 78 located between catcher 42 and an upper wall 82 that exhausts gas flow from deflection zone 64. Second gas flow duct 78 is connected to a negative pressure source 94 that is used to help remove gas flowing through second gas flow duct 78. An optional seal(s) 84 provides an air seal between jetting module 48 and upper wall 82.

As shown in FIG. 3, gas flow deflection mechanism 60 includes positive pressure source 92 and negative pressure source 94. However, depending on the specific application contemplated, gas flow deflection mechanism 60 can include only one of positive pressure source 92 and negative pressure source 94.

Gas supplied by first gas flow duct 72 is directed into the drop deflection zone 64, where it causes large drops 56 to follow large drop trajectory 68 and small drops 54 to follow small drop trajectory 66. As shown in FIG. 3, small drop trajectory 66 is intercepted by a front face 90 of catcher 42. Small drops 54 contact face 90 and flow down face 90 and into a liquid return duct 86 located or formed between catcher 42 and a plate 88. Collected liquid is either recycled and returned to ink reservoir 40 by means of recycling unit 44 (shown in FIG. 1) for reuse or discarded. Large drops 56 bypass catcher 42 and travel on to recording medium 32. Alternatively, catcher 42 can be positioned to intercept large drop trajectory 68. Large drops 56 contact catcher 42 and flow into a liquid return duct located or formed in catcher 42. Collected liquid is either recycled for reuse or discarded. Small drops 54 bypass catcher 42 and travel on to recording medium 32.

Alternatively, deflection can be accomplished by applying heat asymmetrically to filament of liquid 52 using an asymmetric heater 51. When used in this capacity, asymmetric heater 51 typically operates as the drop forming mechanism in addition to the deflection mechanism. This type of drop formation and deflection is known having been described in, for example, U.S. Pat. No. 6,079,821 (Chwalek et al.).

Deflection can also be accomplished using an electrostatic deflection mechanism. Typically, the electrostatic deflection mechanism either incorporates drop charging and drop deflection in a single electrode, like the one described in U.S. Pat. No. 4,636,808 (Herron), or includes separate drop charging and drop deflection electrodes.

As shown in FIG. 3, catcher 42 is a type of catcher commonly referred to as a "Coanda" catcher. Alternatively, catcher 42 can be of any suitable design including, but not limited to, a knife edge catcher, a porous face catcher, a delimited edge catcher, or combinations of any of those described above. The selection of catcher type may depend on the application contemplated.

Continuous stream inkjet printing uses a pressurized ink source which produces a continuous stream of ink droplets. Stimulation devices, such as heaters positioned around the nozzle, stimulate the stream to break up into drops with either relatively large volumes or relatively small volumes. These drops are then directed by one of several means, including electrostatic deflection or gas flow deflection. Printheads utilizing gas flow for deflection are known and have been described.

In continuous inkjet printing, a pressurized ink source is used to eject a filament of fluid through a nozzle bore from which a continuous stream of ink drops are formed using a drop forming device. Drop forming devices, also called stimulation devices, such as heaters positioned around the nozzle, stimulate the stream to break up into drops. The ink drops are directed to an appropriate location using one of several methods (electrostatic deflection, heat deflection, gas deflection, etc.). When no print is desired, the ink drops are deflected into an ink capturing mechanism (catcher, interceptor, gutter, etc.) and either recycled or disposed of. When print is desired, the ink drops are not deflected and allowed to strike a recording medium. Alternatively, deflected ink drops can be allowed to strike the recording medium, while non-deflected ink drops are collected in the ink capturing mechanism.

In a printing system using multiple printheads it is important to maintain print density consistency both between the printheads and over time. The print density produced by a printhead is affected by the optical density of the ink, the properties of the recording medium, by the volume of the ink drops and also by the pixel fill coverage used. The volume of the ink drops depends on the base drop formation frequency, the ink pressure, and the flow characteristics of each printhead. Using the same ink reservoir to supply ink for all printhead, ensures that the ink properties are matched for all the printheads. Typically all printheads in the printing system operate at the same base drop formation frequency as this simplifies the processing and transfer of the print data to the printheads. The remaining sources of print density variation from printhead to printhead are ink pressure differences and variations in the flow characteristics.

Commonly-assigned co-pending application Ser. No. 12/796,715 provides the means to eliminate these final sources of print density variation. Color patches 104 are printed by each of the printheads 30 onto the recording medium 32. A print density sensor 112, located downstream of the printheads along the recording medium path, is used to measure the print density of the color patches 104. Appropriate print density sensors include, but are not limited to, a spectrophotometer, a densitometer, and a CCD array. Based on the measured print densities of the color patches 104, a target pressure is identified for each of the plurality of printheads. The ink pressures for each of the printheads are adjusted to the corresponding target pressure for the printing of subsequent documents. The print density sensors generally work quite well. However, such sensors have been known to fail, both abruptly and in the form of a drift in the sensed print density relative to the actual print density.

The print density sensor 112 can be calibrated by means of a calibration target 170. The calibration target 170 typically is located on a printer frame (not shown) to the side of the path of the recording medium 32. The print density sensor 112 can be translated over to the calibration target where it measures the print density of one or more print density standard patches. This calibration can take place at startup, at a periodic basis, or as requested by the operator.

As all printheads are being supplied with ink from the same ink reservoir, changes in ink properties over time affect all the printheads to the same degree. To minimize print density shifts caused by changes in the ink temperature, an ink temperature control system 142 can be used to maintain a constant ink temperature. Alternatively, the ink pressure is adjusted by a temperature compensation system 144 to compensate for the changes in flow rate produced by changes in the ink temperature.

To minimize print density shifts caused by changes in ink concentration, an ink concentration sensor 148 is used to measure the concentration of the ink. The output of the ink concentration sensor 148 is supplied to an ink concentration control system 146. Ink concentration control systems are well known in the art. Typically such systems maintain the desired ink concentration by controlling the flow of replenishment fluid and ink from the replenishment and ink supplies 154 and 156 respectively to the reservoir 40 in response to signals from the ink concentration sensor 148 and the level sensor 158 associated with the ink reservoir 40. The ink concentration sensors are well known in the art. Common types of include sensors based on ink viscosity, electrical conductivity of the ink, optical absorption, velocity of sound in the fluid, and pump power levels required for a desired flow rate. While these sensors generally work quite well, such sensors have been known to fail, both abruptly and in the form of a drift in the sensed concentration relative to the actual concentration. In some embodiments, the ink concentration sensor can be periodically recalibrated in the printing system. The recalibration can include a measurement of the concentration of fresh ink directly from the ink supply 156.

Figure 4:
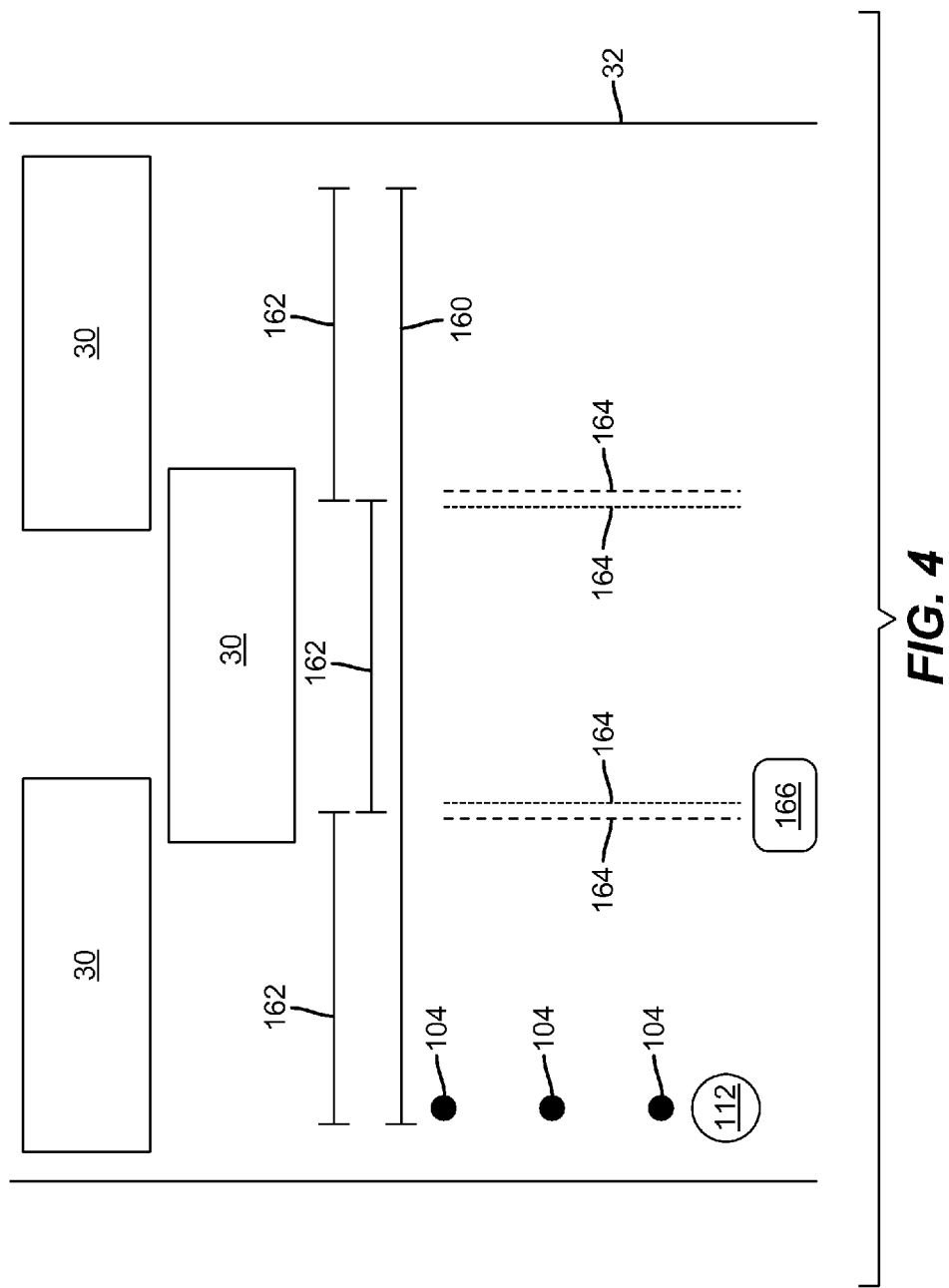
FIG. 4 is a simplified plan view showing an array of printheads positioned over the print media, along with marks printed by printheads on the print media.

When multiple printheads 30 are positioned over the recording medium 32 to produce a wide single print zone 160 as shown in FIG. 4, it is necessary to properly align or register the print swaths 162 from each printhead. One means to accomplish this involves each printhead printing registration marks 164 (returning to FIG. 1) near the print swath seams. A registration sensor 166 is located over the recording medium, downstream of the printheads, to detect the relative position on the print medium of the registration marks from adjacent printheads. Using the measured relative position data, the micro-controller 38, or a separate registration control system, adjusts the printing system to produce the desired registration. In a similar manner, the print from printheads printing different color inks can be registered. Typically the registration sensor 166 is an optical sensor such as a CMOS or CCD based image capture device. The output of such sensors is typically analyzed to determine the relative location of the registration marks in the field of view. In addition to providing data needed for determining the locations of the registration marks, the registration sensor 166 also provides a measure of the print density of the registration marks 164 and any other marks that pass through its field of view. While registration sensor 166 provides a measurement of the print density, it must be recognized that the quality of its print density measurements is, in general, not nearly as good as those of print density sensor 112, which is used to measure the print density of color patches 104.

In addition to these sensors, the printing system may also include one or more verification sensors 172 or camera systems that monitor the print output for various purposes, but can also provide a measurement of the print density. These verification sensors 172 can include print verification systems that confirm that the proper information, such as an address or bar code is printed on the documents. They can also include bar code readability sensors, UCR readability sensors, and sensors used for control of finishing equipment located downstream of the printheads. With each of these verification sensors 172, it must be recognized that the quality of its print density measurements is, in general, not nearly as good as those of print density sensor 112, which is used to measure the print density of color patches 104.

Each of the sensors described above, ink concentration sensor 148, print density sensor 112, registration sensor 166, and verification sensors 172 provide an output signal that in some way correlate to the print density. Depending on the sensor, the correlation may be positive (the output increases when the print density increases) or negative (the output decreases when the print density increases). As a measurement output of each of these sensors is correlated to print density, the various measurements can be used according to the invention to cross check the output of each of the other sensors, to ensure that the print density of the ink on the print media remains well controlled.

Figure 5:
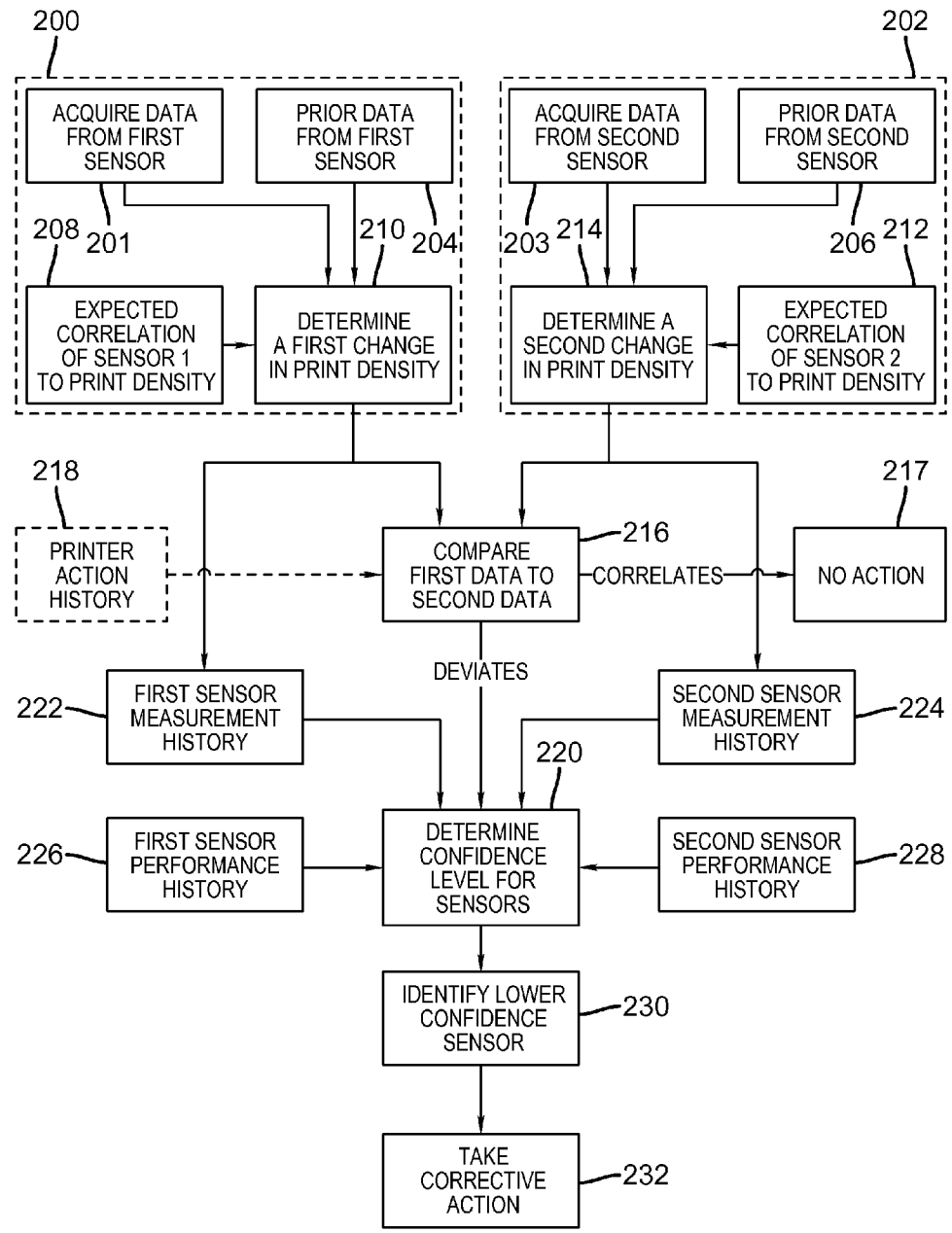
FIG. 5 is a functional block diagram illustrating an embodiment of the method for improved control of the print density according to the present invention.

One embodiment of this invention is illustrated in FIG. 5. The controller acquires first data from a first sensor and second data from a second sensor, 200 and 202 respectively. The first data is compared to the second data in block 216. If the first data correlates with the second data, there is no indication of a sensor failure or error and therefore no action is required to correct for such a sensor failure or error 217. If the first data deviates from the second data, the controller determines the relative confidence level for each of the first and sensors 220. From the determined confidence levels, the sensor with the lowest confidence level, the sensor suspected as the source of the incorrect or invalid measurement, can be identified 230. The controller then initiates action to correct the problem 232.

In a preferred embodiment the acquiring of the first data from the first sensor, may include making a measurement with the first sensor 201. It can further include retrieving from memory previously acquired data 204 from the first sensor. Additionally acquiring the first data can include calculating or determining a change in the print density 210 from the difference in the acquired and retrieved data values by means of an expected correlation factor 208 that relates changes in print density with changes in the measured value from the first sensor. The change in the print density being called a first change as it is determined from the first sensor. Similarly, acquiring of second data from the second sensor can include the steps of making a measurement with the second sensor 203, retrieving from memory previously acquired measurement data from the a second sensor 206, and calculating a change in print density 214 from the difference between the measured value and the retrieved values using an expected correlation factor 212 that relates changes in print density with changes in the measured values from the second sensor. This change in print density is called the second change as it is determined from the second sensor measurements. The expected correlations factors 208 and 212 between the print density and the output of the first and second sensors can be determined theoretically or experimentally. These correlation factors may be specific to the sensor in the printing system, or a common correlation factor may be employed for all sensors of a given type. At least one of the sensors should be acquiring data based on a measurement of some aspect of the print on the recording media, while the other sensor can measure of some aspect of the print on the recording media or alternatively the other sensor can measure ink concentration or some other parameter which is known to affect the print density.

The first data and the second data are compared to each other to see if they are correlated 216. In the illustrated embodiment this comparison includes comparing the first and second changes in print density to determine whether they match. This comparison can include the step of determining whether the shift of one sensed print density is statistically different than the shift for the other sensor. It can also include the step of first determining whether either sensor detected a statistically significant change in the print density from one or both sensors. If the first data correlates with the second data, the no action is required.

In certain embodiments, the comparison 216 can also take into account the operating history 218 of the printer to determine whether a detected deviation of the first data relative to the second data is an outcome of some action taken by the printing system, and therefore is to be expected. For example, following an addition of ink to the fluid reservoir, it is expected that the ink concentration and optical density will rise, conversely when replenishment fluid is added to the fluid reservoir the ink concentration and optical density will drop. Depending on fluid system characteristics, these changes in the ink properties might be detectable by the ink concentration sensor before they make an apparent change in the print density. On the other hand, changing the roll of paper might produce a measured change in print density as measured by the spectrophotometer, with no measured change in ink concentration. If a detected change in the first data relative to the second data is determined to be the result of an action by the printer, again no action is required 217.

If a discrepancy between the first data and the second data is detected by means of the comparison 216, and the discrepancy is not the result of a printer action 218, then relative confidence levels are identified 220 for the sensors. Determining the relative confidence level of the sensor is determining from among the sensors which sensor or sensors are considered to be more or less reliable than the other sensor or sensors, after receiving results from the set of sensors that do not correlate to each other. The step of determining a relative confidence level for the sensors can include comparing the measurements from the sensors with previous measurements 222 and 224 from those sensors, such measurement values having been stored in memory in the printing system. Through such analyses of the measurement history it may be possible to detect abrupt changes or slow drifts in the measured output of one of the sensors can be detected. Identification of a sensor as having an abrupt change or having a slow drift would point to that sensor as being more suspect, or having a lower confidence level than the other sensor which did not have an abrupt change or an identified drift in value.

In addition using the measurement history, the determination of confidence levels can include information related to performance characteristics 226 and 228 of the first and second sensors. The performance characteristics of the sensors can include information related to the common failure or error modes for a sensor, such as, for example, the tendency of certain sensors to drift, and direction of the common drift in response to aging or temperature changes; the tendency to make abrupt changes in output and the typical direction of abrupt change, possibly due to contamination. This list is not exhaustive and many other sensor performance characteristics can be used to confirm that a sensor had given an erroneous result. The performance characteristics can also include the recommended recalibration rate or schedule for the sensor and the time since the most recent calibration. The performance characteristics can also include the install date of the sensors and the service date of the sensors. The use of the performance characteristics of the sensors and the measurement histories of the sensors can aid in identifying the sensor that is most suspected of giving an erroneous measurement result. As a result, the sensor with the lowest confidence level can be determined 230.

Once the sensor with the lowest confidence level is identified 230, corrective action is taken 232. The corrective action taken may depend on which sensor is identified as the suspect sensor, the confidence level of the various sensors, and on the manner in which the sensor discrepancy occurred (sensor drift or an abrupt change in a sensor output). The set of available corrective actions includes initiating a sensor recalibration step, such as causing the print density sensor 112 to be moved over to the calibration target 170 and be recalibrated there. In some cases, the recalibration step may be deferred until the printer stops printing, such as for a paper roll change or between print jobs. In some embodiments, the recalibration of a sensor may include using the measured results from one or more of the other sensors to serve as a temporary standard to recalibrate the suspect sensor. For example, if the output of the spectrophotometer underwent an abrupt step, possibly from a contaminant on the spectrometer lens, the output of the other sensors could be used to create a new calibration that would compensate for the presence of the contaminant. In some embodiments, corrective action options include ceasing to use the suspect sensor in the control of some printer parameter. This can include using the output of another sensor, one with a higher confidence level, instead of the suspect sensor for controlling the printer function that is normally controlled using the now suspect sensor. For example, if the spectrometer used for measuring the print density is determined to the lowest confidence sensor, the printer could employed the print density measurement produced by the registration sensor instead of the spectrometer in the control of print density. In another embodiment, corrective action options include disabling closed loop control of print density rather than continue to use a low confidence level spectrometer sensor to control print density, as continued use of the spectrometer might result in driving the print density well away from its normal values. Following either a sensor recalibration using the other sensors as temporary standards or the disabling of a closed loop control of a printing system parameter, continued monitoring of the system using all appropriate sensors is desirable to determine that the printer does not shift away from the norm. The list of corrective actions that can be carried out by the printing system can also include notifying the operator of an error, allowing him to carry out other corrective actions as may be needed.

As discussed in regard to FIG. 1, the printing system can include a number of sensors, such as registration sensors and verification sensors, for which measurement of image plane registration or verification that the correct data is printed is it primary function and producing a measurement of related to print density is a secondary function. If one of these sensors was identified as the suspect sensor as a result of a drift of abrupt shift in print density measurements, the erroneous print density related measurement may or may not be an indication that the primary function measurements of that sensor may also be suspect. Corrective action for such a sensor could include checking the history of the primary function measurements to determine if they show a change that would correlate with the change in the print density measurements from that sensor. If no such change in the primary function measurements is seen, no further immediate corrective action is needed for that sensor. On the other hand if a change in the primary function measurements correlates with the change in the secondary function, then other corrective action needs to be taken.

Figure 6:
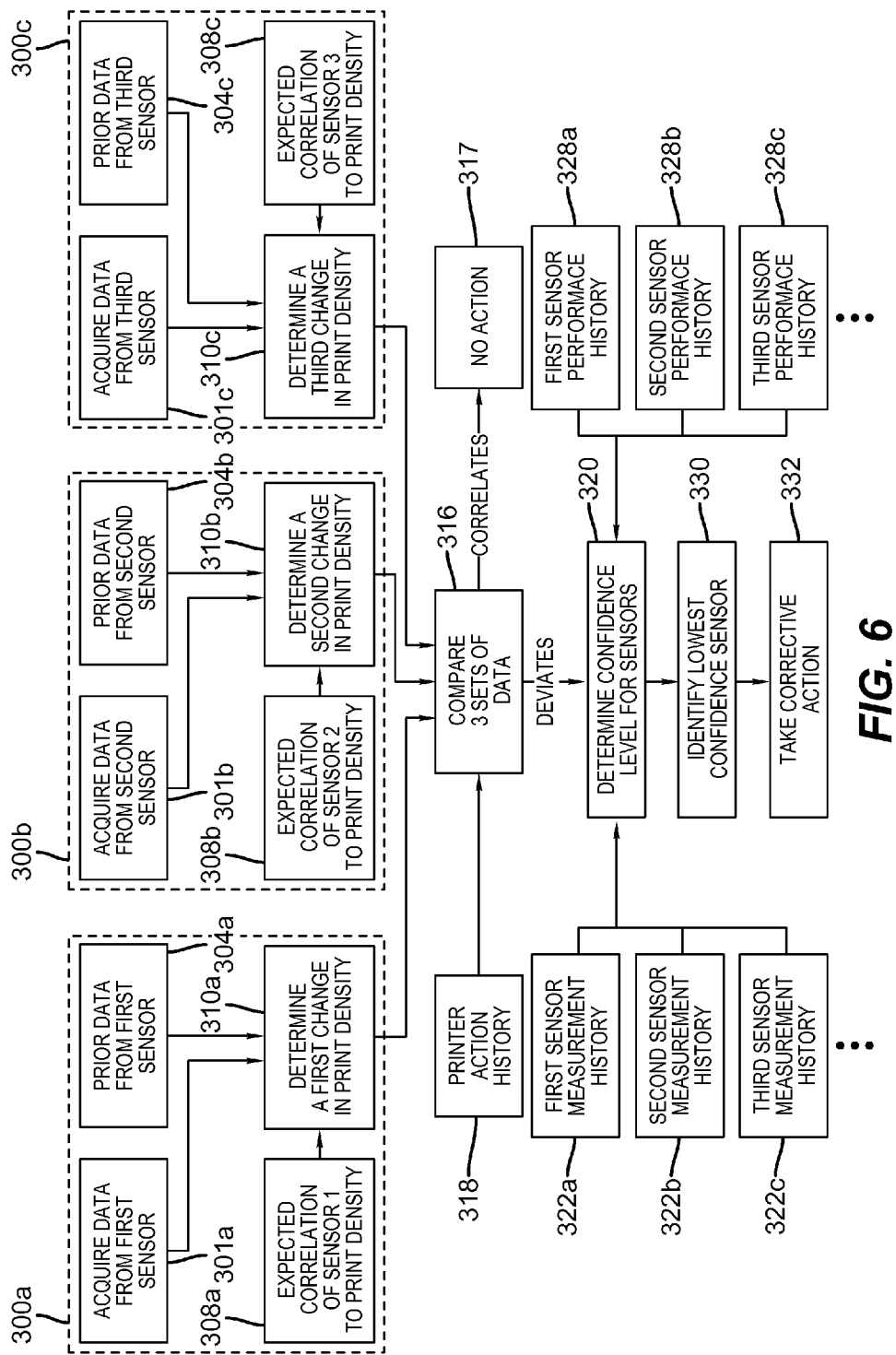
FIG. 6 is a functional block diagram illustrating an alternate embodiment of the method for improved control of the print density according to the present invention.

As mentioned in the discussion of FIG. 1, the printing system can include multiple sensors that provide a measurement of print density. FIG. 6 illustrates that the invented method, shown in FIG. 5, for controlling the print density can be extended to include three or more sensors. In addition to acquiring first and second data from the first and second sensors 300a and 300b, data is acquired from a third sensor 300c, this data is called the third data. As in the embodiment of FIG. 5, steps of acquiring of first, second, and third data 300a-300c from the first, second, and third sensors can include the steps of making a measurement with the sensor 301a-301c, retrieving from memory previously acquired measurement data from that sensor 304a-304c, and calculating a change in print density 310a-310c from the difference between the measured value and the retrieved values using the expected correlation factor 308a-308c that relates changes in print density with changes in the measured values for that sensor.

The method continues with a comparison of the first, second, and third data to each other. The first data is compared to the second data, and the third data is compared to both the first and second data 316. If the data are correlated no action is required 317. As with the earlier embodiment, the comparison can include evaluating the printer action history 318. If a lack of correlation is detected, the relative confidence level of the sensors is determined 320. This can include analysis based on the measurement histories 322a-322c of each sensor, and the sensor performance histories of the sensors 328a-328c. When more than two sensors are employed to cross check each other, the step of determining the relative confidence level of the sensors 330 can also include comparing the data from each of the sensors to identify the sensor whose data is fails to correlate to the data from both of the other sensors. A sensor, whose data fails to correlate to the other two sensors, would have a lower confidence level than the other two sensors. Once the sensor with the lowest confidence level is identified 330, corrective action is taken 332. The corrective action taken may depend on which sensor is identified as the suspect sensor, the confidence level of the various sensors, and on the manner in which the sensor discrepancy occurred (sensor drift or an abrupt change in a sensor output).

While FIG. 1 shows only one group of printheads for printing a single color of printing, additional groups of printheads for printing additional colors of ink can be used. A common print density sensor 112 can be used for measuring the print density of color patches printed by each of the groups of printheads printing each of the colors of ink on one side of the recording medium 32. Similarly a common registration sensor 166 and a common verification sensor 172 can be employed to monitor the output from the output of printheads for multiple ink colors. Each of these sensors can provide a print density related measurement for multiple ink colors. The step of determining a relative confidence level for the sensors can involve evaluation or comparison of print density related measurement results from one or more sensors for multiple ink colors. For example, if comparing the output of a print density sensor such as a spectrophotometer with the output from an ink concentration sensor for one of the ink colors were to indicate a problem, the evaluation of the comparison results for the same print density sensor with the ink concentration sensor for another ink color can provide evidence regarding which sensor has the problem. If for the second color, the print density sensor measurements also are found to deviate from the measurements from the ink concentration sensor, the print density sensor would be considered on the basis of this analysis to have the lower confidence sensor. On the other hand, if the print density sensor measurements also are found to correlate with the measurements from the ink concentration sensor, then the ink concentration sensor would be considered on the basis of this analysis have the lower confidence level.

If there are multiple sensors, it is not necessary to rank order all the sensors relative to each other in terms of confidence level. In general it is only necessary to identify the sensor that is most suspected of giving the erroneous measurement, the sensor with the lowest confidence level.

A second set of sensors 112 are typically used to for making measurements on print on the second side of the recording medium 32. In general there are no sensors that are employed to make measurements that are relevant to the printed image on both the first and second side of the recording media 32. Therefore the invention is independently carried out for the sensors related to the second side of the recording media from the sensors of the first side of the recording media.

The invention has been described in detail with particular reference to certain preferred embodiments thereof, but it will be understood that variations and modifications can be effected within the scope of the invention. For example, the invention has been described for use in a continuous inkjet printer system that employs a gas flow drop deflection mechanism, thermal drop stimulation devices, and nozzle plates fabricated out of silicon. However, the invention can also be employed in continuous inkjet printer systems that use electrostatic drop deflection mechanisms, pressure modulation or vibrating body stimulation devices, and nozzles plates fabricated out of other types of materials.

Electrostatic deflection can be of the type that includes separate drop charging and drop deflection electrodes or can be of the type that incorporates both functions in a single electrode.

The invention has been described in detail with particular reference to certain preferred embodiments thereof, but it will be understood that variations and modifications can be effected within the scope of the invention.

PARTS LIST 20 continuous printing system
22 image source
24 image processing unit
26 mechanism control circuits
28 device
30 printhead
32 recording medium
33 arrow
34 recording medium transport system
36 recording medium transport control system
38 micro-controller
40 reservoir
42 catcher
44 recycling unit
46 pressure regulator
47 channel
48 jetting module
49 nozzle plate
50 plurality of nozzles
51 heater
52 liquid
54 drops
56 drops
57 trajectory
58 drop stream
60 gas flow deflection mechanism
61 positive pressure gas flow structure
62 gas flow
63 negative pressure gas flow structure
64 deflection zone
66 small drop trajectory
68 large drop trajectory
72 first gas flow duct
74 lower wall
76 upper wall
78 second gas flow duct
82 upper wall
84 seal
86 liquid return duct
88 plate
90 front face
92 positive pressure source
94 negative pressure source
96 wall 104 color patch
112 print density sensor
142 temperature control system
144 temperature compensation system
146 ink concentration control system
148 ink concentration sensor
154 replenishment supply
156 ink supply
158 level sensor
160 print zone
162 print swath
164 registration mark
166 registration sensor
170 calibration target
172 verification sensor
200 first sensor
201 acquire data from first sensor
202 second sensor
203 acquire data from second sensor
204 prior data from first sensor
206 prior data from second sensor
208 expected correlation factor
210 determine first change in print density
212 expected correlation factor
214 determine second change in print density
216 first data compared to second data
217 no action
218 printer action history
220 determine confidence level for sensors
222 first sensor measurement history
224 second sensor measurement history
226 first sensor performance history
228 second sensor performance history
230 identify lower confidence sensor
232 take corrective action
300a first sensor
300b second sensor
300c third sensor
301a acquire data from first sensor
301b acquire data from second sensor
301c acquire data from third sensor
304a prior data from first sensor
304b prior data from second sensor
304c prior data from third sensor
308a expected correlation of sensor 1 to print density
308b expected correlation of sensor 2 to print density
308c expected correlation of sensor 3 to print density
310a determine first change in print density
310b determine second change in print density
310c determine third change in print density
316 compare three sets of data
317 no action
318 printer action history
320 determine confidence level for sensors
322a first sensor measurement history
322b second sensor measurement history
322c third sensor measurement history
328a first sensor performance history
328b second sensor performance history
328c third sensor performance history
330 identify lowest confidence sensor
332 take corrective action

The invention claimed is:

1. A method of controlling print density of print from a printhead in a printing system comprising:
   printing on a side of a recording media using a printhead of the printing system;
   gathering first data from a first sensor, the first data having a correlation to the print density of the print;
   gathering second data from a second sensor, the second data having a correlation to the print density of the print;
   comparing the first data to the second data;
   if the first data correlates to the second data no action is required;
   if the first data deviates from the second data;
   check a performance history of each sensors to determine the confidence level;
   check the performance history for abrupt changes, drift, immediate history with respect to sensor characteristics, and sensor failure characteristics;
   determine a confidence level for each sensor;
   identify the sensor with the lowest confidence level; and
   take corrective action.

2. The method of claim 1 wherein the corrective action is based on input from the sensor with the higher confidence level.

3. The method of claim 1 wherein the sensors measure conductivity of an ink in the printing system, or resistivity of the ink in the printing system, or color characteristics of the ink on a media printed by the printing system, or seams between images printed by a plurality of printheads in the printing system, or an alignment of color planes printed by the printing system, or any combination of two or more sensor measurements.

4. The method of claim 3 wherein at least one of the sensors measures a characteristic of the ink on the media.

5. The method of claim 1 wherein said deviation is determined by an abrupt change in correlation of the first data to the second data.

6. The method of claim 1 wherein the step of comparing the first data to the second data further comprises determining that the first data from the first sensor indicates a first change in the print density by virtue of the first correlation and the second data from the second sensor indicates a second change in print density by virtue of the second correlation.

7. The method of claim 6 wherein the step of determining that the first data deviates from the second data comprises determining that there is a significant difference in the indicated first and second changes in print density.

8. The method of claim 1 wherein the first sensor and second sensor are selected from a group consisting of a spectrometer, a densitometer, a camera, a conductivity meter, or a resistivity meter.

9. The method of claim 1 comprising:
   gathering third data from a third sensor;
   comparing the third data to the first and second data;
   if the third data correlates to the first and second data no action is required;
   if the third data deviates with at least one of the first and second data;
   determine a confidence level for third sensor;
   identify the sensor with the lowest confidence level from the first, second, and third sensors; and
   take corrective action.

10. The method of claim 9 wherein the sensor with the lowest confidence level is the sensor that deviates from both of the other sensors.

11. The method of claim 1 wherein one sensor measures some aspect of the print on the recording media and the other sensor comprises an ink concentration sensor.

12. A method of controlling print density in a printing system comprising:

printing on a side of the print media with the printing system, the print on the print media having a print density;

gathering first data from a first sensor and second data from a second sensor;

transmitting the first data and the second data to a controller;

comparing the first data and historic performance data from the first sensor to get a first result;

comparing the second data and historic performance data from the second sensor to get a second result;

analyzing the first result and the second result to determine whether the first sensor and the second sensor correlate with each other;

when the analysis of the first result and the second result do not correlate with each other, determining a confidence level of the first sensor and the second sensor; and adjusting a printing system characteristic using the sensor having the higher confidence level.

13. The method of claim 12 wherein historic performance data is selected from a group consisting of performance history of the sensors, install date of the sensors, service date of the sensors, and time between sensor calibrations.

14. The method of claim 12 wherein the printing system characteristics to be adjusted are selected from a group consisting of ink concentration and ink pressure.

\* \* \* \* \*